United States Patent [19]

Hosomi et al.

[11] Patent Number: 4,749,831
[45] Date of Patent: Jun. 7, 1988

[54] DEAD TANK TYPE GAS CIRCUIT BREAKER

[75] Inventors: Mamoru Hosomi; Michiharu Okuno, both of Amagasaki, Japan

[73] Assignee: Mitsubishi Denki Kabushiki Kaisha, Tokyo, Japan

[21] Appl. No.: 52,191

[22] Filed: May 20, 1987

Related U.S. Application Data

[63] Continuation of Ser. No. 804,071, Dec. 3, 1985, abandoned.

[30] Foreign Application Priority Data

Dec. 20, 1984 [JP] Japan ................ 59-271241

[51] Int. Cl.4 ............................................ H01H 33/82
[52] U.S. Cl. ................................................ 200/148 A
[58] Field of Search .......... 200/148 R, 148 A, 148 B, 200/148 C, 148 E, 148 G, 146 A, 149 A, 150 G

[56] References Cited

U.S. PATENT DOCUMENTS

| | | | |
|---|---|---|---|
| 3,946,180 | 3/1976 | Votta et al. | 200/148 A |
| 4,289,942 | 9/1981 | Milianowicz | 200/148 A |
| 4,320,270 | 3/1982 | Graf | 200/148 A |
| 4,434,336 | 2/1984 | Garzon | 200/148 A |
| 4,445,020 | 4/1984 | Veda et al. | 200/148 A |

FOREIGN PATENT DOCUMENTS 58-71524  4/1983  Japan .
59-75528  4/1984  Japan .
59-25329  6/1984  Japan .

Primary Examiner—Mark O. Budd
Attorney, Agent, or Firm—Lowe, Price, Leblanc, Becker & Shup

[57] ABSTRACT

A dead tank type gas circuit breaker has a deflection member (102a) in a supporting member (10) for a fixed contact is disclosed; and the deflection member (102a) deflects flow of the hot gas, to make a region of non-direct exposure to hot gas in which area an insulator (12) for fixing the supporting member (10) is provided.

4 Claims, 3 Drawing Sheets

DEAD TANK TYPE GAS CIRCUIT BREAKER

This application is a continuation of application Ser. No. 804,071, filed Dec. 3, 1985, now abandoned.

FIELD OF THE INVENTION AND RELATED ART STATEMENT

1. Field of the Invention

The present invention relates to improvements in dead tank type gas circuit breaker.

2. Description of the Related Art

A typical conventional dead tank type gas circuit breaker is described hereafter with reference to FIG. 1. FIG. 1 shows a closing state thereof where a moving main contact 4 is connected to a fixed main contact 2. The fixed main contact 2 and the moving main contact 4 are provided in a dead tank 14 filled with an insulating gas, e.g., $SF_6$ gas. A fixed arc contact 6 and a moving arc contact 8 are provided for preventing arc between the fixed main contact 2 and the moving main contact 4. The fixed arc contact 6 and the fixed main contact 2 are supported by a supporting means 10 for fixed contact. The supporting means 10 is fixed to a dead tank 14 by a cylindrical insulator 12.

FIG. 2 shows a sectional view taken along line II—II of FIG. 1. The supporting means 10 consists of a flange 102 and a bar 104 fixed to the flange 102 by bolts 16. Center part 104a of the bar 104 has a thread 104b in which the fixed main contact 6 is screwed for fixing.

A breaking operation of the conventional dead tank type gas circuit breaker is described hereafter with reference to FIG. 3. The moving main contact 4 and the moving arc contact 8 are moved in a direction shown by an arrow A. The moving arc contact 8 is disconnected from the fixed arc contact 6 after disconnection of the moving contact from the fixed contact. Thus an arc 20 is produced between the moving contact and the fixed contact. Simultaneously with generation of the arc 20, arc-quenching gas being compressed by movement of a puffer cylinder 18 is blown against the arc 20 by action of a nozzle 24. The blown arc-suppression gas makes highly efficient arc-suppression.

Hot gas (arced $SF_6$ gas) having a high temperature and a degraded dielectric strength is produced by heat dissipation of the arc-quenching gas. A large quantity of hot gas is led into an inner part 26 of the insulator 12 as shown by arrows B and C, which does not quickly spread by virtue of the hot gas. The obstructed hot gas causes a deterioration of the dielectric strength of the insulator 12. The deterioration of the dielectric strength increases the likelihood of ground fault. Further, slow spreading of the hot gas causes deterioration of recovery-efficiency of insulation, because the hot gas is filled between the fixed arc contact 6 and the moving arc contact 8.

The hot gas also flows in a direction shown by an arrow D because the hot gas is filled between the fixed arc contact 6 and the moving arc contact 8, causing degradation of the dielectric strength between the fixed main contact 2 and moving main contact 4. Such disadvantage can be prevented by providing a large gap between the fixed main contact 2 and the moving main contact 4, but to provide such a large gap causes an increase in size of the circuit breaker.

SUMMARY OF THE INVENTION

An object of the present invention is to provide an improved dead tank type gas circuit breaker which is small in size and has an increased dielectric strength.

The dead tank type gas circuit breaker in accordance with the present invention comprises:
fixed main contact,
fixed arc contact,
supporting means for supporting the fixed contact having opening and deflecition means for deflecting flow of hot gas to make area of non-direct exposure to hot gas, and
an insulator for fixing the supporting means to dead tank and being provided in the area of non-direct exposure to hot gas.

DESCRIPTION OF A PREFERRED EMBODIMENT

The structure of a preferred embodiment of a dead tank type gas circuit breaker embodying the present invention is described in detail with reference to FIGS. 4 and 5.

Figure 1:
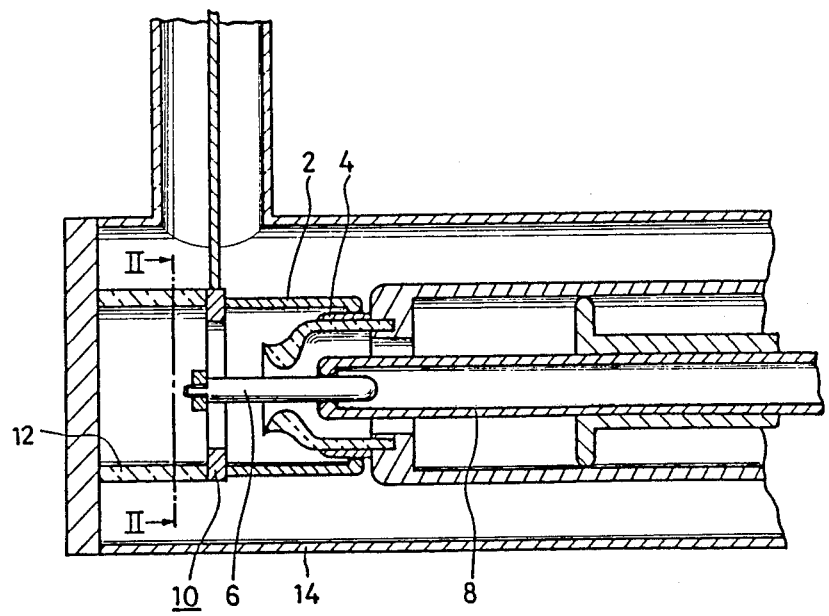
FIG. 1 is the cross-sectional side view of the conventional dead tank type gas circuit breaker in the closed state.
Figure 2:
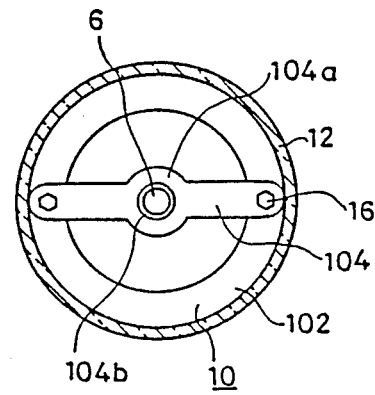
FIG. 2 is the sectional view taken along the line II—II of FIG. 1.
Figure 3:
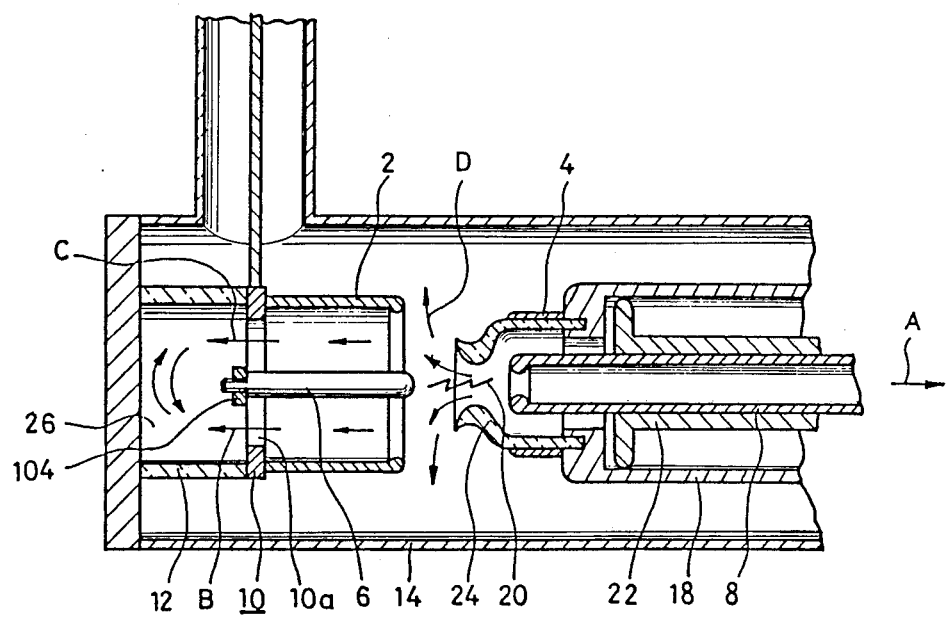
FIG. 3 is the cross-sectional side view of the conventional dead tank gas circuit breaker during interruption.
Figure 4:
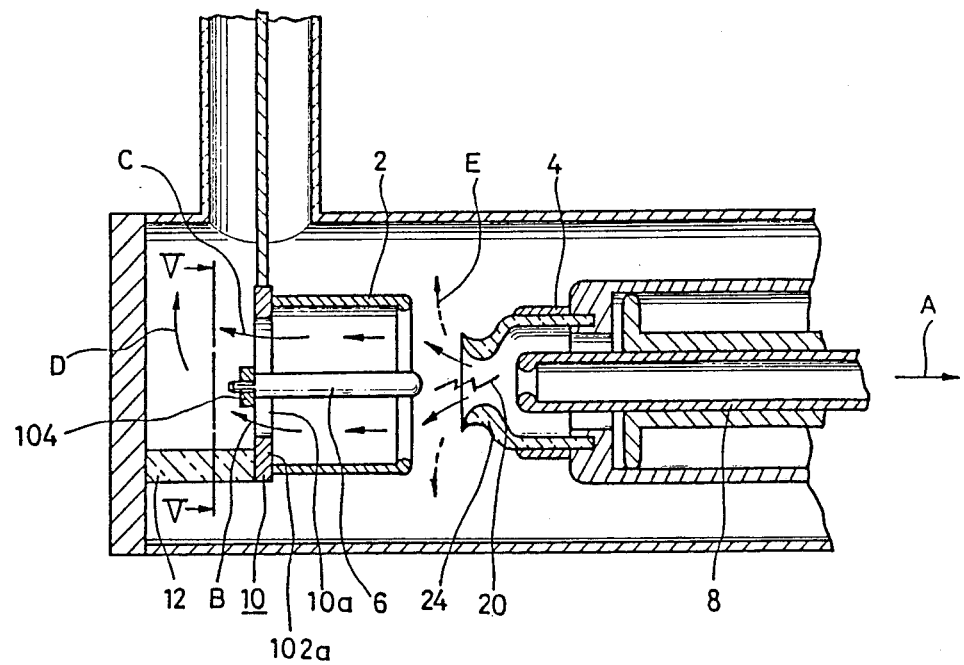
FIG. 4 is a cross-sectional side view of an example of a dead tank type gas circuit breaker embodying the present invention during interruption.

As shown in FIG. 4, a fixed main contact 2 and a moving main contact 4 are provided in a dead tank 14 filled with an arc-quenching gas, e.g., $SF_6$ gas. A fixed arc contact 6 and the fixed main contact 2 are supported by a supporting means 10 for fixed contact. The supporting means 10 is fixed to a dead tank 14 by insulator 12.

Figure 5:
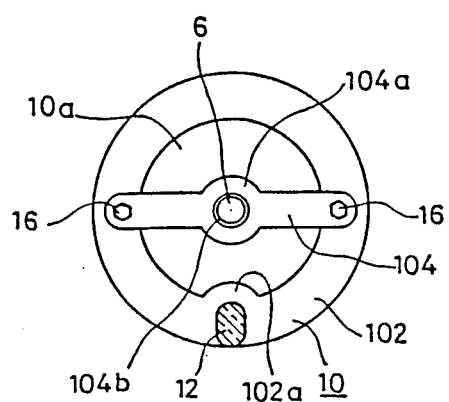
FIG. 5 is a sectional view taken along line V—V of FIG. 4.

FIG. 5 shows a sectional view taken along line V—V of FIG. 4. The supporting means 10 comprises a flange 102 and a bar 104 fixed to the flange 102 by bolts 16. Center part 104a of the bar 104 has thread 104b in which the fixed main contact 6 is screwed for fixing. The flange 102 has a projection 102a as a deflection means.

Breaking operation of the dead tank type gas circuit breaker of the embodiment is described hereafter with reference to FIGS. 4 and 5. The moving main contact 4 and the moving arc contact 8 are driven in a direction shown by an arrow A. The moving arc contact 8 is disconnected to the fixed arc contact 6 after disconnection of the moving main contact 4 from the fixed main contact 2. Thus, an arc 20 is produced between the moving arc contact 8 and the fixed arc contact 6. Coincident with production of the arc 20, arc-quenching gas compressed by movement of a puffer cylinder 18 is blown against the arc 20 by known piston like action of a nozzle 24. The blown arc-quenching gas makes highly efficient arc-quenching.

The hot gas flows as shown by arrows B, C and D through an opengin 10a of the supporting means 10. The hot gas quickly spreads because the hot gas is not obstructed by the insulator 12. The degradation of the dielectric strength of the insulator 12 is not caused because the hot gas is not obstructed. Therefore, the hot gas hardly flows in the direction shown by an arrow E. And furthermore, the projection 102a deflects the flow of the hot gas as shown by the arrow D, and the insulator 12 is not directly exposed to the high temperature hot gas which causes the degradation of the dielectric strength of the insulator 12.

In other modified embodiments, the deflection means may be constituted with a separate member from the flange 102, or the defleciton means may be provided on the bar 104.

In further modified embodiments, the bar 104 may be constituted with an integrated member with the flange 102.

As has been described in detail for various embodiments, the dead tank type gas circuit breaker in accordance with the present invention is highly efficient for interruption, as a result of achieving quick spreading of the hot gas. Further, the degradation of the dielectric stength of the insulator 12 is not caused, because the insulator 12 is not directly exposed to the high temperature hot gas which causes the degradation of the dielectric strength of the insulator 12. Furthermore, degradation of the dielectric strength between the fixed main contact and moving main contact is not caused, because very little hot gas flows through the space between the fixed main contact and the moving main contact. Thus, an undesirable large distance between the fixed main contact and moving main contact is not necessary. Accordingly, according to the present invention, a small sized and highly efficient circuit breaker is provided.

What is claimed is:

1. A dead tank type gas circuit breaker comprising:
a fixed main contact,
a fixed arc contact,
stationary supporting means including a flange for supporting said fixed contact, said supporting means having opening and deflection means for deflecting a flow of hot gas and thereby define an area of non-direct exposure to hot gas, and
a stationary column shaped insulator for fixing said supporting means to the dead tank, said insulator being located in said area of non-direct exposure to hot gas, wherein said opening and deflection means includes a radial projection projecting inwardly from said flange to deflect the gas flow away from the stationary insulator by directing the gas flow in a radial direction away from the insulator, wherein said stationary insulator is a generally solid post having one end fixed to the flange immediately directly adjacent said radial projection, the latter projecting radially inwardly from said post.

2. A dead tank type gas circuit breaker in accordance with claim 1 wherein
said supporting means for fixed contact has a flange and a bar fixed to said flange by bolts.

3. A dead tank type gas circuit breaker in accordance with claim 1, wherein
said insulator is a solid cylindrical post.

4. A dead tank type gas circuit breaker comprising:
a fixed main contact,
a fixed arc contact,
stationary supporting means including an annular flange-like member for supporting said fixed contact, said supporting means having an opening through which flows a hot gas generated on breaking operation,
a generally solid post-shaped insulator having one end fixed to said stationary supporting means and another end fixed to the tank for insulating said stationary supporting means and said tank,
deflection means provided near said post-shaped insulator in said opening of stationary supporting means, said deflection means including a portion on said flange having an edge located radially inwardly of said post for deflecting said hot gas flow away from said post-shaped insulator to avoid contact with said post-shaped insulator and thereby improve dielectric strength.

* * * * *